United States Patent [19]

Würmli

[11] 4,410,340
[45] Oct. 18, 1983

[54] APPARATUS FOR SEPARATING FIBRE MATERIAL

[75] Inventor: Arthur Würmli, Winterthur, Switzerland

[73] Assignee: Rieter Machine Works Limited, Winterthur, Switzerland

[21] Appl. No.: 353,648

[22] Filed: Mar. 1, 1982

[30] Foreign Application Priority Data

Jun. 3, 1981 [CH] Switzerland ............... 1517/80

[51] Int. Cl.³ ........................................... B01D 46/38
[52] U.S. Cl. ........................................ 55/290; 55/351; 55/432; 100/192
[58] Field of Search .............. 55/290, 429, 432, 351, 55/400; 15/256.51, 256.52; 100/192; 210/391, 402

[56] References Cited

U.S. PATENT DOCUMENTS

| | | | |
|---|---|---|---|
| 3,110,182 | 11/1963 | Moss et al. | 55/351 |
| 3,479,950 | 11/1969 | Freeman | 100/192 |
| 3,789,752 | 2/1974 | Wirz | 100/192 |
| 3,841,066 | 10/1974 | Wakeen | 55/290 |

FOREIGN PATENT DOCUMENTS

87 of 1889 United Kingdom ............... 55/290

*Primary Examiner*—Bernard Nozick
*Attorney, Agent, or Firm*—Werner W. Kleeman

[57] ABSTRACT

An apparatus for separating fibre material from an air stream or current of a penumatic transporting system contains a filter or perforated drum internally of which there prevails a vacuum. The fibre material drops from the drum at a take-off zone or region, in the form of a fibre layer or mat, into a receiving container or the like. This fibre layer is then removed from the receiving container, by using a plunger, and deposited, in an outfeed or delivery duct or channel. The spacing of the fibre take-off zone at the drum from the bottom or floor of the container is limited to a value which avoids tearing of the fibre layer or mat. Jamming or clogging of fibre material when using a rotating filter or perforated drum is avoided, since the take-off of the dropping or outbound fibre layer from the filter or perforated drum is perfected cleanly throughout. There results the advantage that danger of fires and damage, caused by fibre jamming, are essentially precluded. Since the dimensions of the receiving container can be maintained small there is also achieved a saving in space.

11 Claims, 2 Drawing Figures

ABPPARATUS FOR SEPARATING FIBRE MATERIAL

BACKGROUND OF THE INVENTION

The present invention relates to a new and improved construction of apparatus for separating fibre material from an air stream or current of a pneumatic transporting system.

It is well known in the textile industry that, when working with fibre material, freely flying fibres or fibres separated-out of a normal work process, can be engaged by means of an air stream or current, and subsequently are again separated-out of the transporting air stream and collected. With state-of-the-art methods, for instance as disclosed in Swiss Pat. No. 262,239 or Japanese Utility Model Publication No. 51-53, 287, the fibres are again separated from a moved air stream or current, by means of which they have been seized and transported, by catching such fibres at the outer surface of a filter or sieve drum. Thereafter, the fibres are again eliminated from the filter drum surface by using an arrangement comprising a vacuum screen or seal and a roll.

With such prior art arrangements the fibre material which has accumulated on the surface of the filter drum and again removed therefrom in the form of a fibre layer or mat displays irregularities in its density. At narrow locations of the drum fibre jamming or clogging can occur if the fibres are not properly removed from the surface of the filter drum, so that damage can occur. Due to the friction arising between the jammed or clogged locations and the rotating drum heat is additionally generated, such that the fibre material can be caused to ignite, something which obviously is totally undesirable and can lead to the most obvious detrimental consequences in a textile mill.

SUMMARY OF THE INVENTION

Therefore, with the foregoing in mind it is a primary object of the present invention to provide a new and improved construction of apparatus for separating fibre material in a manner not associated with the aforementioned drawbacks and limitations of the prior art proposals.

Another and more specific object of the present invention relates to a new and improved construction of apparatus for reliably separating fibre material from the surface of a filter of perforated drum or the like in a manner precluding fibre jamming or clogging and the resultant undesirable malfunction and damage.

Yet a further significant object of the present invention is directed to a new and improved construction of apparatus for separating fibre material from the surface of a rotating filter drum or the like, in a manner reliably removing the fibre material from the drum surface, the apparatus being designed such that there is very little likelihood of rupture of the withdrawn fibre layer as it is deposited in a receiving container arranged in cooperative relationship with the rotating filter drum.

A further significant object of the present invention is directed to a new and improved construction of apparatus for separating fibre material from an air stream, which apparatus is relatively simple in construction and design, extremely economical to manufacture, highly reliable in operation, not readily subject to breakdown or malfunction, and requires a minimum of maintenance and servicing.

Now in order to implement these and still further objects of the invention, which will become more readily apparent as the description proceeds, the apparatus for separating fibre material is characterized by the features:

there is provided a rotatable filter or perforated drum internally of which, during operation of the apparatus, vacuum conditions prevail, and which is provided with a filter or sieve-type jacket or outer surface at which merges the transporting system;

a screen or cover closes the inner surface of the jacket of the drum at a fibre take-off or detachment zone;

a container is located below the fibre take-off zone or region and serves to receive the fibre layer or mat removed from the take-off zone and dropping into the receiving container;

a delivery or outfeed channel or duct leads away from the container towards an outlet or exit opening, and there is provided an intermittently operating plunger for displacing the fibre layer, collected in the receiving container, from that location into the delivery channel or duct; and The spacing or distance of the fibre take-off zone or region from the bottom or floor of the receiving container is chosen such that it is not greater than that length of the dropping fibre layer or mat which, during operation of the apparatus, is still just capable of avoiding a tearing or rupture of such fibre layer.

The invention proceeds from the recognition that with the state-of-the-art apparatuses, by virtue of there being present locations of different density of the fibre layer detached from the jacket surface of the filter drum, there can arise the situation that the fibre layer which drops into a collecting container can tear. This, in turn, can result in the undesirable phenomenon that the fibres no longer completely detach from the rotating drum, instead cling thereto and will be entrained thereby. This leads to the aforementioned jamming or clogging phenomenon which is undesired.

According to the present invention the rupture of the fibre layer is to be avoided. This fibre layer or mat moves, following its detachment from the filter drum by the action of its inherent weight into a receiving container or receiver located below the fibre take-off region or zone and such taken-off fibre layer is collected in this container or the like. The greater the distance between the receiving container and the fibre take-off zone or region, or the lower that there is located such receiving container, the longer and therefore that much heavier does there become the dropping fibre layer. In accordance with the invention the distance between the bottom of the receiving container and the fibre take-off or detachment zone, i.e. the length of the fibre layer dropping into the receiving container, is chosen such that the weight of the fibre layer or its length, respectively, does not exceed the value at which tearing of the fibre layer is still just avoided. This value depends upon the type of fibre material which is processed, for instance, upon the fibre length, the magnitude of the deviations in the density of the fibre layer, upon the rotational speed of the filter or perforated drum, and upon the quantity of fly waste which is transported.

When working with a limited length of the dropping fibre layer or mat, the receiving container can not be chosen of random depth. Since the receiving container possesses a limited depth, under circumstances it can happen that it fills-up relatively rapidly, and therefore according to a further aspect of the invention this receiving container is emptied by means of an intermittently operating plunger or equivalent structure which outfeeds the fibre layer to a withdrawal or delivery channel or duct. Through the provision of such plunger there is realized the following notable advantages: there are situations which are encountered where the amount of available space is limited or scarce. When encountering such situations, by virtue of the presence of the intermittently operating plunger, the spacing of the receiving container from the take-off zone and/or the container itself can be chosen to be smaller than required according to the invention for fulfilling the requirement of not tearing the fibre layer or mat. The present invention therefore affords the possibility of saving space for the receiving container or the filling or drop chute for the fibre layer.

According to a particular embodiment of the invention the delivery or withdrawal channel or duct narrows in a direction away from the container towards the outlet or exit opening in a manner such that during expulsion of the fibre layer by means of the delivery channel or duct there is accomplished at the same time therein a compaction of the fibre layer. With this embodiment there is obtained as an additional advantage also a space-saving construction for the collecting container or box for the removed and recollected fibre material in comparison to constructions wherein such collecting containers are chosen to be relatively large-in-size for the purpose of avoiding having to empty such containers within impractically short time intervals.

This embodiment of the invention additionally is of appreciable significance when the apparatus is used in conjunction with a transport system of great length or expanse, for instance, with a transport system extending over the entire length of a spinning machine. For reliably collecting the entire fly waste when using such a transport or transporting system, there is required a sufficiently strong or forceful air stream, i.e. a relatively strong vacuum is required within the filter or perforated drum. In order to avoid that, in such cases, large quantities of false or leakage air streams can penetrate into the filter or perforated drum at the vicinity of the merging zone or interface of the transporting system with the perforated drum, a further embodiment of the invention contemplates enclosing the filter or perforated drum and the receiving container within a compartment or chamber within which there prevails a vacuum which is less strong than the one prevailing internally of the filter drum, but which ensures that the above-mentioned false air streams are reduced to an acceptable degree. With this inventive further construction of the invention, the above-discussed compaction of the fibre layer in the withdrawal or discharge channel or duct constitutes a particularly significant advantage. Such compaction prevents the air from the surrounding room from flowing through the withdrawal or delivery channel into the compartment, since, of course, the delivery channel or duct must open into the surrounding space or ambient region. The compacted fibre layer thus beneficially seals the withdrawal or delivery channel and the interior of the compartment against air flowing in from the outside through the delivery channel or duct.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
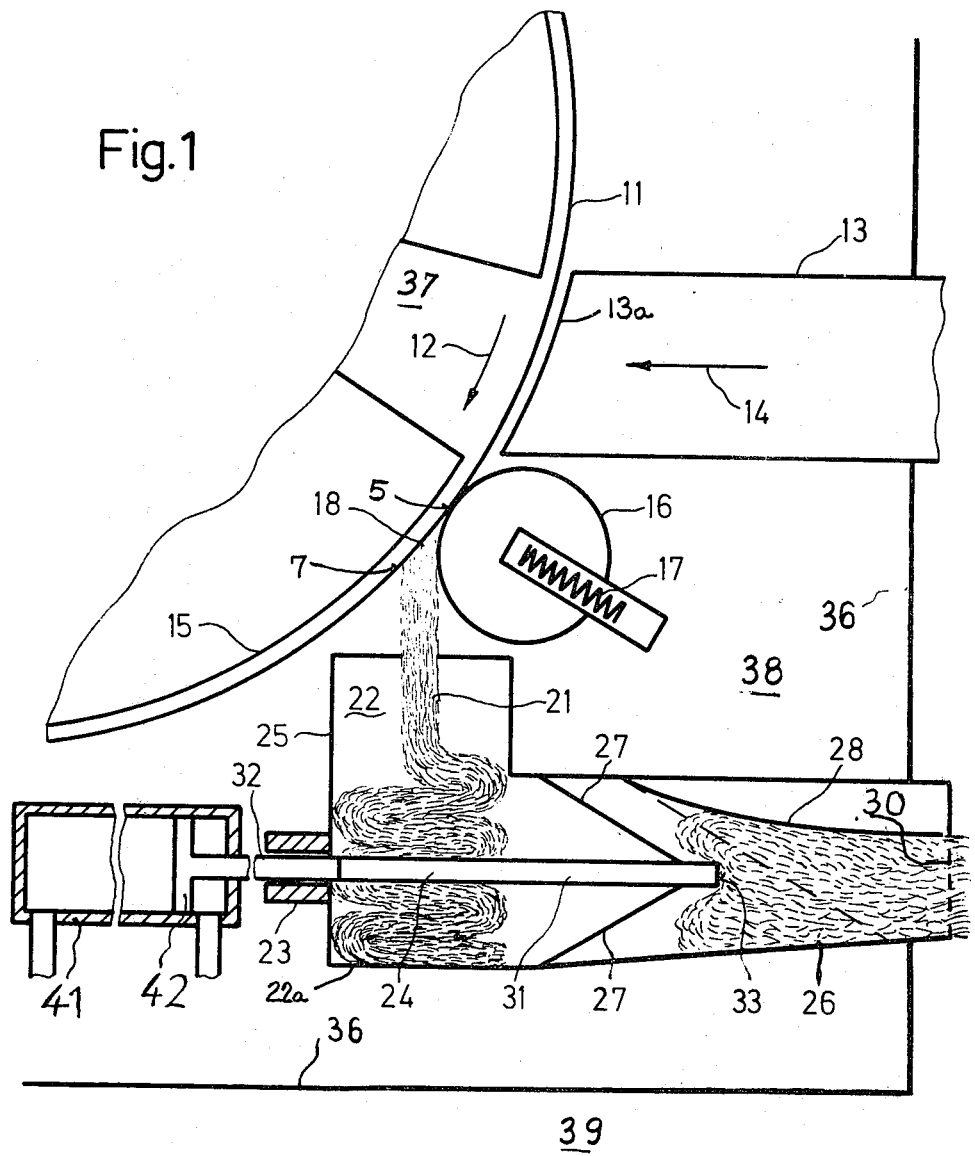
FIG. 1 is a side fragmentary view showing a first exemplary embodiment of apparatus for separating fibre material according to the invention.

Describing now the drawings, it is to be understood that only enough of the exemplary constructions of apparatus for separating fibre material have been shown therein so as to enable those skilled in the art to readily understand the underlying principles and concepts of the present development, while simplifying the illustration of the drawings. Turning attention now to FIG. 1, there is depicted a rotatable drum, generally designated by reference character 37, which contains a filter or sieve-like jacket or outer surface 11 through which extend openings. This filter or perforated drum or drum member 37 is rotatable in the direction of the arrow 12. Internally of the filter or perforated drum 37 there prevails a reduced air pressure or vacuum. A pneumatic transport or transporting system 13 merges or opens at the region of the jacket or outer surface 11 of the filter or perforated drum 37 and the merging end portion or mouth 13a is configured in shape so as to conform to the curvature of the drum jacket or outer surface 11. An air current or stream flows within the transport system 13 in the direction of the arrow 14. By means of this air current 14 there is transported fibre material, such as, for instance, individual fibres or thread or yarn portions. Within the drum 37 there is located a screen or cover 15 which extends at a small spacing from the drum jacket or outer surface 11. This screen or sealing cover 15 serves for screening the vacuum or negative pressure and, depending upon the prevailing requirements, can extend over a larger or smaller portion of the circumference of the drum jacket 11.

Located immediately adjacent to the transport system 13, and disposed opposite the screen 15 in relation to the drum shell or jacket 11, is a roll or roller 16. This roll 16 is biased by means of a spring 17 against the drum jacket or outer surface 11 and augments the detachment or take-off of the fibre material from the drum jacket 11. It is intended to have as little air as possible flow between the transport system 13 and the roll 16. At this take-off or detachment zone 18, the approximate width extension of which has been indicated by the two marks 5 and 7 in the drawing of FIG. 1, the fibres detach from the drum jacket or outer surface 11 during operation of the equipment.

The detached or released fibres form a fibre layer or mat 21—sometimes also referred to as a fibre bat—which is collected in a receiving container or receptacle 22 or equivalent structure. A guide 23 which is rigidly connected with the receiving container 22, is employed for guiding a plunger 24 or equivalent structure which is movable essentially in horizontal direction. This plunger 24 can be driven, for instance, pneumatically by means of a piston 42 which reciprocates within a work cylinder 41. This plunger 24 has been illustrated in FIG. 1 in its forwardmost position and can be retracted to a position where the end face 33 thereof is located at the height of the container wall 25, i.e. essentially in a plane containing this wall 25. The container 22 is open in the direction of a withdrawal or delivery channel or duct 26. Internally of the delivery channel or duct 26 there are mounted two retaining or hold-back baffles or flap members 27 or equivalent structure which bear resiliently against one another and against the forwardly thrusted plunger 24. Additionally, there is also present a closure or seal baffle 28 which likewise is elastic or resilient. In its closed position this seal or closure baffle or flap member 28 assumes the broken line position depicted in FIG. 1. The withdrawal or delivery channel 26 tapers in a direction away from the container 22 and towards the delivery or exit opening 30. The plunger 24 consists of a plunger head portion 31 and a plunger rod 32. This surface-like or areal plunger 31 extends in the horizontal direction, at right angles to the pushing or thrust direction of the plunger 24, perpendicular to the plane of the drawing, over the inner space or region of the receiving container 22.

During operation of the depicted exemplary embodiment of apparatus for the separation of fibre material, an air stream is generated in the transporting or transport system 13 by virtue of the vacuum conditions prevailing within the perforated or filter drum 37. This air stream in the transporting system 13 transports fibre material or fly waste in the direction of the arrow 14 towards the drum jacket or outer surface 11. Owing to the vacuum prevailing internally of the filter drum 37 the air stream flows into the interior of such drum 37 and the fibres remain clinging to the outside surface of the drum jacket 11. As soon as the fibres which have deposited on the rotating drum jacket 11 are located at the height of the seal cover or screen 15 the suction action ceases, so that the fibre material can detach from the drum jacket or outer surface 11 at the detachment or take-off zone or region 18. This fibre material then moves downwardly in the form of a fibre layer or mat 21, extending perpendicular to the plane of the drawing, by virtue of its inherent weight and collects within the receiving container 22 or the like.

It its normal position the plunger 24 is located in its retracted position, shown to the left of the illustration of FIG. 1, where the end face or surface 33 is flush with the container wall 25. After a certain amount of time, during which the receiving container 22 has been filled with the fibre layer to a certain extent, the plunger 24 is then thrusted into its front terminal position shown in FIG. 1. Consequently, the plunger head portion 31 displaces the accumulated fibre layer in front of such forwardly thrusted plunger head portion moves the displaced fiber layer past the retaining baffles or flap members 27 into the withdrawal or delivery channel 26. Thereafter, the plunger 24 is again retracted into its starting or initial position.

The retaining baffles or flap members 27 prevent undesirable return movement of the fibre layer during this retracting or return movement of the plunger 24. After the plunger 24 has again remained for a certain amount of time in its starting position, it again effects a pushing movement and once more pushes a certain quantity of fibre layer, which has accumulated in the receiving container 22, into the withdrawal or delivery channel 26. Hence, the portion of the fibre layer 21 which previously was displaced into the delivery channel 26 during the initial pushing cycle is now pushed further towards the direction of the delivery or exit opening 30.

After the plunger 24 has repeatedly pushed portions of the fibre layer 21 into the delivery channel or duct 26, the sealing or closure baffle 28 has been displaced into its position depicted in full lines. By virtue of the elasticity of the baffle or flap member 28 and also because of the narrowing or tapering form of the delivery channel or duct 26, which tapers towards the delivery opening 30 of such delivery channel 26, the fibre layer is beneficially compacted during its passage through such delivery channel or duct 26. During this process the retaining or hold-back baffles or flap members 27 also exert somewhat of a compacting action upon the fibre layer. The not particularly illustrated collecting box, into which the fibre material is deposited after departing from the delivery channel or duct 26, therefore can take-up a much greater quantity of such fibre material than would be the case without compaction thereof.

It is already known to collect the fibre layer 21 which moves downwardly from the detachment or take-of zone 18 within a container. Since this fibre layer 21 is in a very loose state, such type of receiving container must be extremely large in size and must frequently be emptied. A large receiving container, however, also requires a large distance between the fibre detachment or take-off zone 18 and the receiving container or its floor, respectively. Under these circumstances there are present the conditions which promote tearing or rupture of the fibre layer 21 along with the attendant drawbacks described initially at the outset of this disclosure. As already mentioned, in accordance with the invention the distance or spacing of the container 22 or the container bottom or floor 22a, respectively, from the fibre take-off or detachment zone 18, i.e. the length of the dropping fibre layer 21, is limited in a manner such that tearing or rupture of the fibre layer 21 does not occur and at least is just avoided. Thus, reliable and clean detachment of fibres from the drum jacket or outer surface 11 is ensured for at all times.

It will be therefore apparent that in many instances the receiving container 22 advantageously extends with its upper end at one side, for instance at the side of the wall 25, as closely as possible to the drum jacket 11 and at the other side extends directly up to the location of the fibre take-off roll 16. It also has been found to be advantageous if the plunger 22 moves transversely or at right angles with respect to the dropping direction of the fibre layer 21 or at least moves approximately horizontally, and the path of movement of the plunger 24 extends at the direct neighborhood of the filter drum 37 or its drum jacket 11, respectively.

Figure 2:
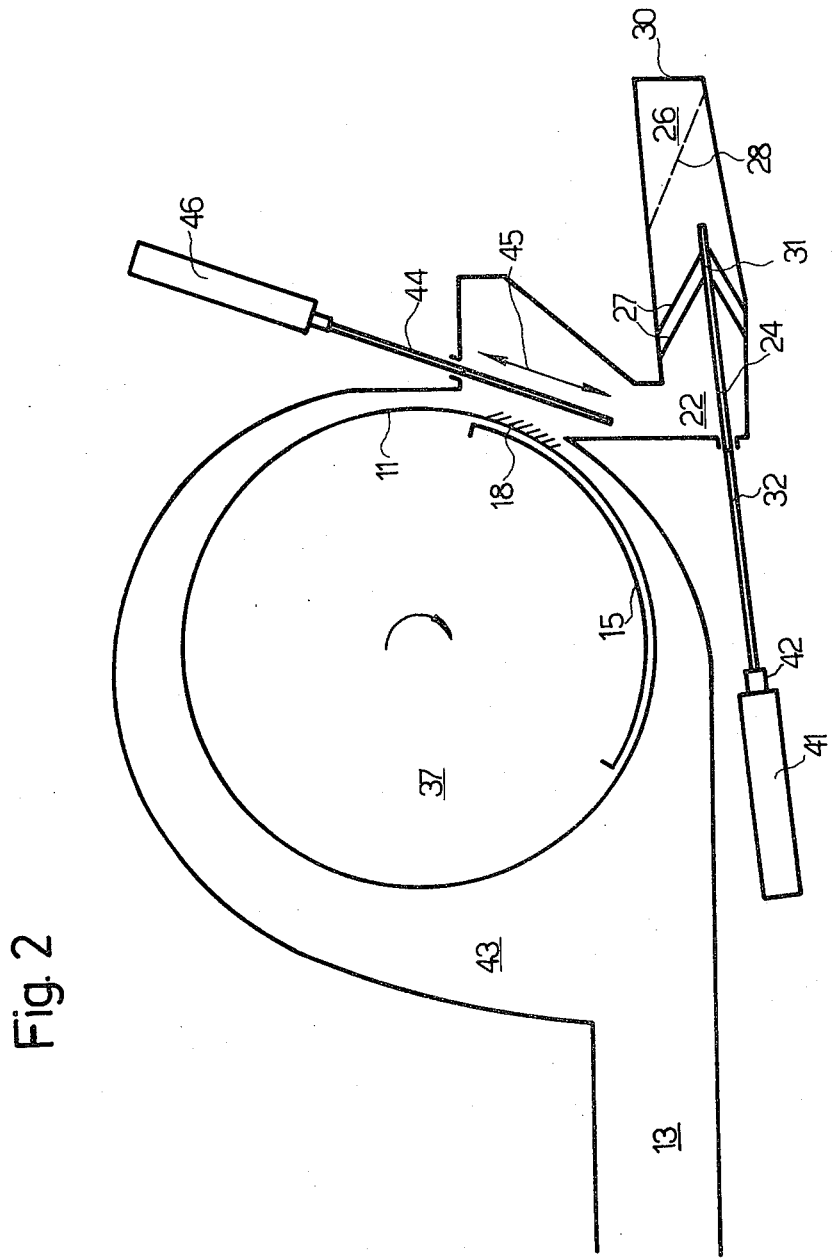
FIG. 2 is a schematic side view of a modified construction of apparatus for separating fibre material.

FIG. 2 illustrates a modified embodiment of apparatus for separating fibre material, wherein there is here provided a slide arrangement in place of the take-off roll 16. FIG. 2 again illustrates a filter or perforated drum 37 equipped with a filter or seive-type drum jacket or outer surface 11. Here also, a pneumatic transporting system 13 merges or opens at the drum jacket 11, and additionally there is provided a sealing cover or screen 15, a fibre take-off or detachment zone 18, a receiving container 22, a withdrawal or delivery channel 26 equipped with the hold-back or retaining baffles or flap members 27 and 28 and a delivery or exit opening 30, as well as a plunger 24 which contains a plunger head portion 31 and a plunger rod 32. The drive of the plunger 24 is accomplished by means of a fluid-operated cylinder unit 41 within which there can be moved to-and-fro a piston 42 by means of a suitable hydraulic or pneumatic fluid medium. The filter drum 37 together with the fibre-receiving jacket 11 is located internally of a compartment or chamber 43 which encloses the filter drum 37 and the receiving container 22 or the like.

In this embodiment there are provided two slides or slide members 44 which are movable opposite or out-of-phase with respect to one another in the direction of the double-headed arrow 45. In the showing of FIG. 2 the one slide member 44 is visible and such depicted slide member 44 covers the second slide member 44 located therebehind. These slide members or slides 44 are driven, for instance, by a not particularly referenced piston member movable within a work or operating cylinder 46. These slide members 44 or equivalent fibre feed means serve to move the fibre material downwardly into the receiving container 22.

According to the embodiment depicted in FIG. 2, the fibre material taken-off at the detachment or take-off zone or region 18 of the drum jacket 11, during the operation of the apparatus, is moved into the receiving container 22 with the aid of the displaceable slide members 44. Consequently, the slide members 44 move at a velocity which does not exceed the dropping or fall velocity of the fibre material. The slide members 44, even when moving at a velocity which is slower than the dropping velocity of the fibre material, exert a pulling-off or detachment effect upon the fibre material away from the drum jacket 11 if, for any reason, such fibre material should undesirably cling to the drum jacket or outer surface 11. Hence, the provision of such sliding members 44 beneficially prevents, in a most reliable manner, the previously discussed undesirable and dangerous jamming or clogging of the fibre material at narrow locations of the filter drum.

As already initially mentioned, a relatively forceful vacuum is required internally of the filter or perforated drum 37 when working with an extended or expansive transporting system 13. In order to reduce the air quantities flowing in the form of a leakage or false air current into the interior of the filter or perforated drum 37 between the merging point of the transporting system 13 and the drum jacket 11, the filter drum 37 and the receiving container 22 are advantageously enclosed within a chamber or compartment 38, as the same has been shown for instance for the embodiment of FIG. 1. As to such chamber or compartment 38 only the walls 36 are visible in the illustration of FIG. 1 in order to simplify the drawings. During operation of the apparatus the air pressure within the compartment or chamber 38 is lower than the pressure of the air in the surrounding room or the ambient space 39 externally of the compartment 38, yet is higher than the air pressure within the filter or perforated drum 37. With this arrangement the sealing baffle or flap member 28 prevents the penetration of appreciable quantities of air by means of the delivery channel or duct 26 from the outside room or space 39 into the compartment or chamber 38 bounded by the compartment walls 36. For this purpose, the sealing baffle or flap member 28 contacts the inner walls of the withdrawal or channel 26 at all sides, as long as there is not present any fibre layer 21 within the delivery channel or duct 26. Upon the presence of fibre layer 21, however, such fibre layer or material is compacted, as previously explained, and therefore there is practically suppressed any penetration of air through the delivery channel or duct 26. By virtue of these measures there is facilitated to a large extent the establishment and maintenance of a vacuum within the compartment or chamber 38. It should be apparent that even in the event that there is employed only a delivery channel or duct 26 which merely tapers in its cross-sectional configuration, without the use of any closure flap or sealing baffle 28, it is possible to already obtain a sufficient compaction of the fibre layer, so that there can be established internally of the compartment 38 bounded by the walls 36 a sufficiently great negative pressure or vacuum. In corresponding manner, in the embodiment of FIG. 2, the air pressure within the compartment or chamber 43 possesses a value which lies between the pressure prevailing in the surrounding outside area or room and the pressure prevailing internally of the filter or perforated drum 37. Thus, with the embodiment of FIG. 2, analogous conditions prevail to those just described above.

While there are shown and described present preferred embodiments of the invention, it is to be distinctly understood that the invention is not limited thereto, but may be otherwise variously embodied and practiced withing the scope of the following claims. Accordingly,

What I claim is:

1. An apparatus for separating fibre material from an air stream of a pneumatic transporting system, comprising:

a rotatable filter drum internally of which there prevails a vacuum during operation of the separating apparatus;

said filter drum containing a substantially sieve-like drum jacket at which merges said transporting system;

said filter drum including a fibre take-off zone from which there is removed the fibre material;

screen means for covering an inner surface of the drum jacket at the region of said fibre take-off zone;

a receiving container arranged below the fibre take-off zone for taking-up a fibre layer removed at the take-off zone and dropping into said receiving container;

a delivery channel provided with an exit opening;

said delivery channel leading away from said receiving container towards said exit opening;

an intermittently operating plunger for displacing fibre layer collected in said receiving container from said receiving container into said delivery channel;

means for intermittently operating said plunger;

said receiving container having a container floor;

the spacing of the fibre take-off zone from the floor of said container failing to exceed that length of the dropping fibre layer at which, during operation of the separating apparatus, there still can be just avoided tearing of the fibre layer;

closure flap means located in said delivery channel;

said closure flap means being movable into a sealing position extending from an attachment point of said closure flap means in said delivery channel towards said exit opening at an angle with respect to the lengthwise axis of said delivery channel and across said lengthwise axis; and said closure flap means being structured to be elastically pre-biased against the fibre layer located in said delivery channel.

2. The apparatus as defined in claim 1, wherein:

said plunger travels through a predetermined path of movement; and said delivery channel and said path of movement of said plunger extending at least approximately horizontally and said path of movement of said plunger extending in the direct vicinity of said drum jacket.

3. The apparatus as defined in claim 9, further including:
means defining a compartment surrounding said filter drum and said receiving container;
said compartment being under vacuum during operation of the separating apparatus and the vacuum being of a magnitude which is between the vacuum prevailing within the filter drum and the pressure of the outside air; and
said closure flap means contacting an inner surface of said delivery channel at all sides thereof when said delivery channel is empty of fibre material.

4. The apparatus as defined in claim 1, wherein:
said receiving container has a side portion which extends at an upper end thereof to the immediate vicinity of said filter drum.

5. The apparatus as defined in claim 4, further including:
a roll located at the region of the takeoff zone and externally of said drum jacket;
said roll contacting said drum jacket; and
said container including a further side portion which extends from below to the immediate vicinity of said roll.

6. The apparatus as defined in claim 1, wherein:
said means for intermittently operating said plunger moving said plunger in a pushing motion from a position located opposite the delivery channel positioned at the receiving container, through said receiving container and into the delivery channel and again back through a plunger retracting movement.

7. The apparatus as defined in claim 6, wherein:
said plunger comprises a plunger head portion and a plunger rod at which there is mounted said plunger head portion; and
said plunger head portion extending substantially horizontally and at essentially right angles to the direction of pushing motion of the plunger across the internal space of said receiving container.

8. The apparatus as defined in claim 7, wherein:
said plunger head portion comprises a large surface head portion.

9. The apparatus as defined in claim 1, wherein:
said delivery channel possesses a diminishing cross-sectional area from the receiving container towards said exit opening.

10. The apparatus as defined in claim 9, further including:
means defining a compartment surrounding said filter drum and said receiving container; and
said compartment being under vacuum during operation of the separating apparatus and the vacuum being of a magnitude which is between the vacuum prevailing within the filter drum and the pressure of the outside air.

11. An apparatus for separating fibre material from an air stream of a pneumatic transporting system, comprising:
a rotatable filter drum internally of which there prevails a vacuum during operation of the separating apparatus;
said filter drum containing a substantially sieve-like drum jacket at which merges said transporting system;
said filter drum including a fibre take-off zone from which there is removed the fibre material;
screen means for covering an inner surface of the drum jacket at the region of said fibre take-off zone;
a receiving container arranged below the fibre take-off zone for taking-up a fibre layer removed at the take-off zone and dropping into said receiving container;
a delivery channel provided with an exit opening;
said delivery channel leading away from said receiving container towards said exit opening;
an intermittently operating plunger to displacing the fibre layer collected in said receiving container from said receiving container into said delivery channel;
means for intermittently operating said plunger;
said receiving container having a container floor;
the spacing of the fibre take-off zone from the floor of said container failing to exceed that length of the dropping fibre layer at which, during operation of the separating apparatus, there still can be just avoided tearing of the fibre layer;
said means for intermittently operating said plunger moving said plunger in a pushing motion from a position located opposite the delivery channel positioned at the receiving container, through said receiving container and into the delivery channel and again back through a plunger retracting movement;
retaining baffles provided within said delivery channel;
said retaining baffles extending from an attachment location thereof within said delivery channel towards said exit opening at an angle with respect to the lengthwise axis of said delivery channel towards the central region of said delivery channel; and
said retaining baffles being structured to be elastically pre-biased against said plunger when pushed into a position contacting said retaining baffles.

* * * * *

UNITED STATES PATENT AND TRADEMARK OFFICE
CERTIFICATE OF CORRECTION

PATENT NO. : 4,410,340

DATED : October 18, 1983

INVENTOR(S) : ARTHUR WüRMLI

It is certified that error appears in the above–identified patent and that said Letters Patent are hereby corrected as shown below:

Column 9, line 3, correct "9" to read --1--

Column 10, line 26, correct "to" to read --for--.

Signed and Sealed this

Third Day of January 1984

[SEAL]

Attest:

GERALD J. MOSSINGHOFF

Attesting Officer — Commissioner of Patents and Trademarks